United States Patent
Chellappa

(10) Patent No.: US 7,220,699 B2
(45) Date of Patent: May 22, 2007

(54) CATALYST INCORPORATION IN A MICROREACTOR

(75) Inventor: Anand Chellappa, Albuquerque, NM (US)

(73) Assignee: Intelligent Energy, Inc., Long Beach, CA (US)

( * ) Notice: Subject to any disclaimer, the term of this patent is extended or adjusted under 35 U.S.C. 154(b) by 357 days.

(21) Appl. No.: 10/404,882

(22) Filed: Mar. 31, 2003

(65) Prior Publication Data
US 2004/0191137 A1    Sep. 30, 2004

(51) Int. Cl.
*B01J 23/00* (2006.01)
*B01J 21/00* (2006.01)
*B01J 20/00* (2006.01)

(52) U.S. Cl. .............. 502/325; 502/326; 502/327; 502/329; 502/330; 502/331; 502/332; 502/333; 502/334; 502/335; 502/336; 502/337; 502/338; 502/339; 502/344; 502/345; 502/346; 502/349; 502/355; 502/415; 502/439; 502/527.12; 502/527.13; 502/238; 502/239; 502/240; 502/242; 502/243; 502/244; 502/245; 502/253; 502/258; 502/259; 502/260; 502/261; 502/262; 502/263

(58) Field of Classification Search ........ 502/325–327, 502/329–339, 344–346, 349, 355, 415, 439, 502/527.12, 527.13, 238, 239, 240, 242, 502/243–245, 253, 258–263
See application file for complete search history.

(56) References Cited

U.S. PATENT DOCUMENTS

| | | | |
|---|---|---|---|
| 3,305,403 A * | 2/1967 | Corso, Jr. et al. ............ 502/101 |
| 3,799,796 A * | 3/1974 | Hunter ........................ 427/227 |
| 3,992,330 A * | 11/1976 | Noakes et al. .............. 502/336 |
| 4,058,485 A * | 11/1977 | Cheung ....................... 502/331 |
| 4,193,793 A * | 3/1980 | Cheung ........................ 75/235 |
| 4,288,346 A * | 9/1981 | Hunter et al. ................... 502/2 |
| 4,711,009 A | 12/1987 | Cornelison et al. |
| 4,752,599 A * | 6/1988 | Nakamura et al. .......... 502/257 |
| 4,829,655 A | 5/1989 | Cornelison et al. |
| 4,916,105 A * | 4/1990 | Rieck et al. ................. 502/303 |
| 4,931,421 A * | 6/1990 | Shibata ....................... 502/439 |
| 4,959,342 A * | 9/1990 | Shibata ....................... 502/439 |
| 5,011,810 A | 4/1991 | Michimoto et al. |
| 5,026,273 A * | 6/1991 | Cornelison ................... 431/170 |
| 5,118,475 A * | 6/1992 | Cornelison ................... 422/174 |
| 5,250,489 A | 10/1993 | Dalla Betta et al. |
| 5,288,470 A * | 2/1994 | Cornelison et al. ......... 422/177 |
| 5,328,359 A | 7/1994 | Retallick |
| 5,422,331 A * | 6/1995 | Galligan et al. ............. 502/333 |
| 5,612,277 A | 3/1997 | Harkonen et al. |
| 5,643,543 A * | 7/1997 | Guibard et al. .......... 423/213.5 |
| 6,071,850 A * | 6/2000 | Friedman et al. ............ 502/439 |
| 6,116,014 A | 9/2000 | Dalla Betta et al. |
| 6,203,764 B1 | 3/2001 | Benson |
| 6,217,832 B1 | 4/2001 | Betta et al. |
| 6,361,757 B1 | 3/2002 | Shikada et al. |
| 2002/0168466 A1 | 11/2002 | Tapphorn et al. |

* cited by examiner

*Primary Examiner*—Cam N. Nguyen
(74) *Attorney, Agent, or Firm*—Greenberg Traurig LLP

(57) ABSTRACT

A method and device for loading a catalyst into a chamber. The catalyst loading is well suited for production of hydrogen producing microreactors. The catalyst is coated onto a strip which is mountable within the chamber.

13 Claims, 4 Drawing Sheets

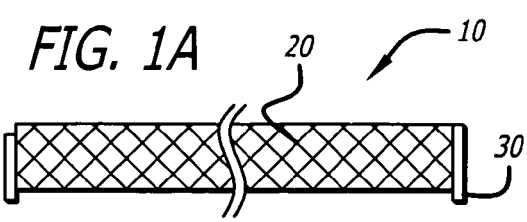
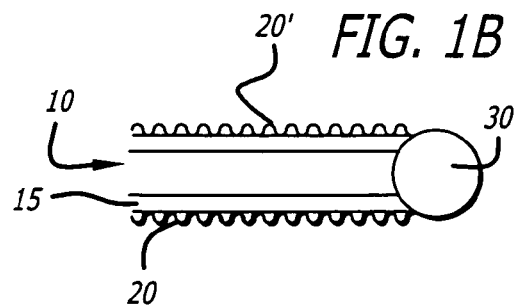
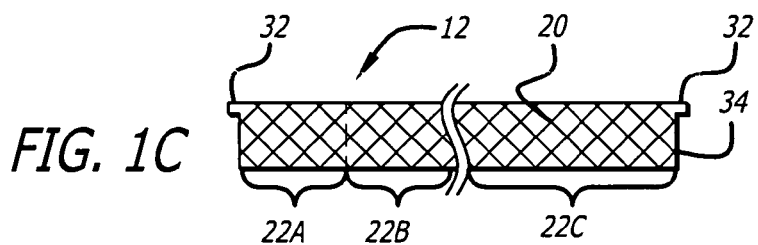
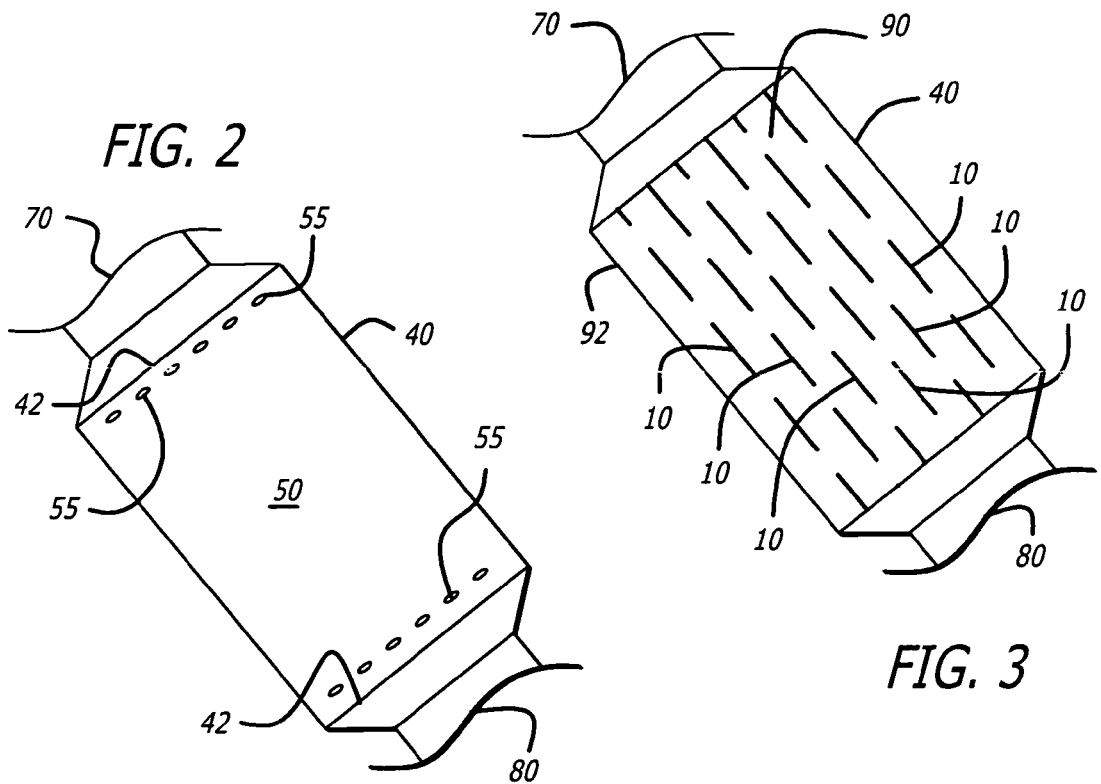
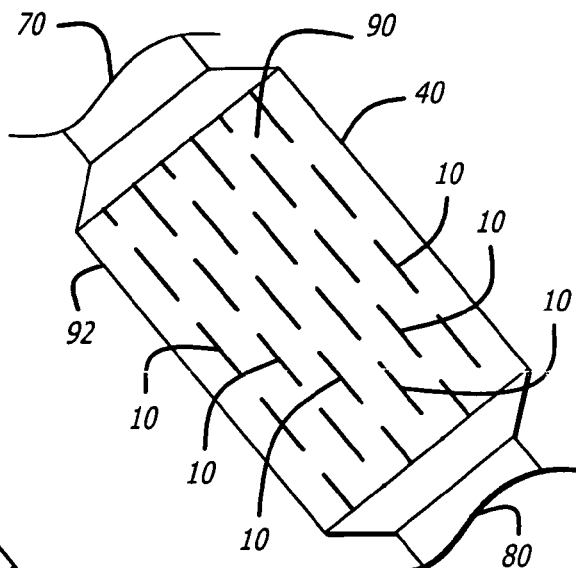

US 7,220,699 B2

CATALYST INCORPORATION IN A MICROREACTOR

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention generally relates to the chemical arts generally to a method and device for loading a catalyst into chambers, more particularly to loading a catalyst into chambers associated with a small reactor which may be a microreactor. One microreactor which this method and device is suitable for is a microreactor for generating hydrogen gas by decomposing or reforming a hydrocarbon fuel.

2. Background of the Invention

The growing popularity of portable electronic devices has produced an increased demand for compact and correspondingly portable electrical power sources to energize these devices. Developments in robotics and other emerging technology applications are further increasing the demand for small, independent power sources.

At present, storage or rechargeable batteries are typically used to provide independent electrical power sources for portable devices. However, the amount of energy that can be stored in storage or rechargeable batteries is insufficient to meet the need of certain applications.

Fuel cells have potential as a replacement for some batteries. Because they can operate on very energy-dense fuels, fuel cell-based power supplies offer high energy-to-weight ratios compared with batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly for portable applications, where small size and low weight are desirable.

A common fuel cell is a polymer electrolyte membrane fuel cell (PEMFC). PEMFC's are constructed of an anode and a cathode separated by a polymer electrolyte membrane. The polymer electrolyte membrane is also known in the industry as a proton exchange membrane Functionally, fuel cells generate electricity by stripping an electron off hydrogen and allowing the charged proton H+ to pass through the proton exchange membrane while the electron e-travels around the proton exchange membrane thereby producing a voltage.

The charged hydrogen proton then reacts with atmospheric oxygen to produce water. In some applications, generally smaller PEMFC under about 2 KW, the PEMFC can function as an "air-breather" (see generally U.S. Pat. No. 6,117,577 issued to Wilson). In an air-breather oxygen can typically be obtained from the ambient atmosphere, only a source of hydrogen must be provided to operate the fuel cell.

Hydrogen supplied to such a fuel cell can be provided in a gaseous form from a tank of hydrogen, or it can be generated by reformation. However, providing compressed hydrogen is not always a viable option, because of the substantial volume that even a highly compressed gas occupies. Liquid hydrogen, which occupies less volume, is a cryogenic liquid, and a significant amount of energy is required to achieve the extremely low temperatures required to liquefy gaseous hydrogen.

The hydrogen supply can also be generated by a steam reforming method or a partial oxidation method, using as feedstock hydrocarbons such as LPG, naphtha, gasoline, kerosene, alcohol, coal or natural gas composed principally of methane or non-hydrocarbons such as ammonia.

Catalysts are commonly used to facilitate reformation of hydrocarbons within a reactor. Catalysts are also often used to facilitate the combustion in a combustion chamber of a microreactor to supply thermal energy for the reformation process.

Incorporation of catalysts into a microreactors is commonly done by either packing the catalyst particles or pellets into a chamber, into cut channels in a chamber, or catalyst coating the walls of cut channels in a chamber. Metal foams, screens, mesh and wires are also commonly used as a support substrate for catalysts. However, one limitation of metal foam supported catalyst is the tortuous flow pattern created and the pressure drops and resistance associated therewith. Also, the incorporation of a catalyst coated metal foam substrate necessitates intimate contact between the foam and the reactor body to provide good heat transfer.

Another feature beneficial to a microreactor is a structure wherein flow channels are provided in the reactor to facilitate the flow of gases over the catalyst while minimizing pressure drop, and facilitating heat transfer.

Flow channels can be machined with CNC or EDM milling. However, both have limitations with the aspect ratios (length/height) that can be achieved. EDM is also an expensive technique not well-suited for mass production.

Therefore, it is a desideratum to provide a method and device for catalyst loading into a chamber such as a reactor, it is also a desideratum to provide a method and device for catalyst incorporation into a chamber, which provides for flow channels without expensive CNC or EDM milling.

SUMMARY OF THE INVENTION

Now in accordance with this invention there has been found a method and device for incorporating a catalyst into a chamber. The chamber may be a part of a microreactor. The chamber may be a combustion or reaction chamber in a microreactor.

A method of loading a catalyst on a mountable strip formed of a base substrate with a catalyst support ; the catalyst support coated with at least catalyst. The strip being mountable in a chamber. The strips of uncoated base substrate and catalyst support may, in some instances, be mounted into a chamber and then coated with a catalyst.

A method of loading catalysts into a chamber, whereby catalyst loaded strips mate into a mounting, protrusions, clasps, cavities, catches, slots, grove, channel, catch or latch in the a chamber. The chamber can be sealed or sealable and unsealable.

A chamber, which can communicate via one or more ports, loaded with mountable catalyst coated strip. The strips can be formed of a metallic base substrate with a catalyst support material, including but not limited to alumina, silica, zirconia and ceria, affixed thereto and coated with at least one catalyst.

Two or more strips can be mounted with the chamber, in a predetermined configuration to form flow channels. The flow channel may be meso-scale, straight, serpentine or have straight or serpentine regions.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appendent claims.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1A is a catalysts coated strip.

FIG. 1B is a bottom view of the embodiment in FIG. 1A.

FIG. 1C is an alternative catalyst load strip.

FIG. 2 is a reaction chamber to receive catalyst loaded strips.

FIG. 3 is a reaction chamber with strips loaded.

Figure 4:
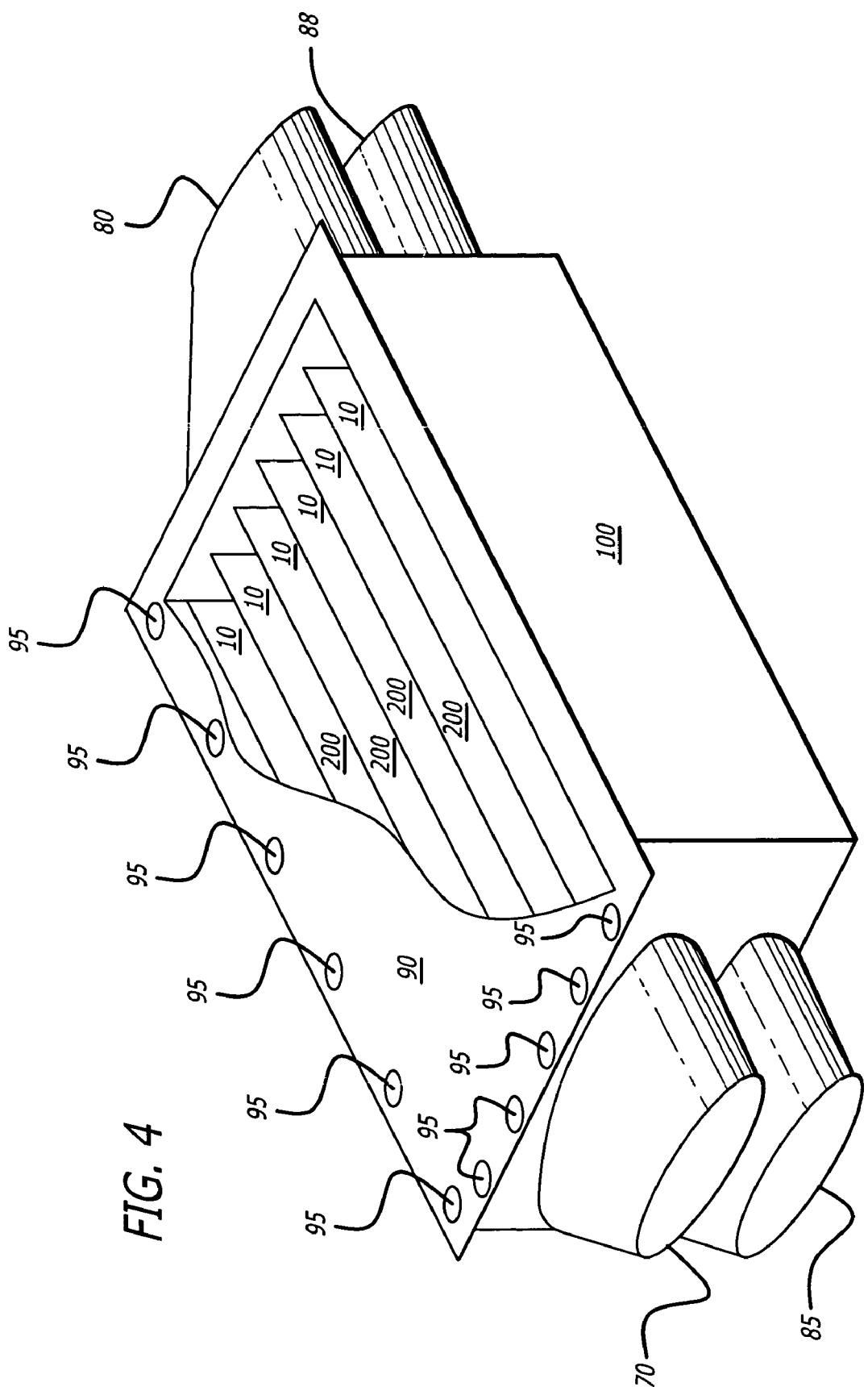
FIG. 4 is an exploded isometric view of a microreactor.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE PREFERRED EMBODIMENTS

Particular embodiments of the invention are described below in considerable detail for the purpose for illustrating its principles and operation. However, various modifications may be made, and the scope of the invention is not limited to the exemplary embodiments described. For example, while specific reference is made to microreactors, or hydrogen generators that employ natural gas or methane as a hydrocarbon fuel supply, it can be appreciated that this process is also of utility for using other hydrogen rich fuels such as propane, butane, LPG, gasoline, Jet fuel, diesel; renewables such as soybean oil, soydiesel; oxygenates such as methanol, ethanol; and ammonia.

An exemplary catalyst loaded strip 10 is shown in FIGS. 1A & 1B. The strip is substantially planar and is coated with a catalyst 20 & 20' on each side. The base substrate of the strip is preferably metal and may be stainless steel 316, or nickel or FeCrAlYor Inconel 600. Strips made out of ceramic materials such as alumina may also be used. In addition, the strips may be made of catalyst materials. For example, a molybdenum carbide strip can catalyze steam reforming reactions under selected operating conditions. The catalysts may be the same or different. Mounting legs 30 extend from the strip 10 for mounting into a chamber.

Mounting legs 30 are not the exclusive means by which the catalyst loaded metal strips may be loaded. FIG. 1C shows a catalyst loaded 20 strip 12 with mounting arms 32 extended therefrom. Mounting arms 32, or even the edge of a catalyst loaded strip 34 can mate with a protrusions, fixture, clasps, cavities, catches, slots, grove, channel, catch or latch (not shown).

The catalyst can be coated onto the strip by a number of different process including but not limited to, wet impregnation, spray coating, and chemical vapor deposition. Preferably, as shown in FIG. 1B, prior to catalyst deposition, a layer of a catalyst support material 15 is deposited, affixed or otherwise bonded to, the metal strip 10. Suitable support material 15 include such as combinations of alumina, silica, zirconia or ceria. The support material 15 is deposited to provide a high surface area substrate to receive the catalyst material. The catalyst support material 10 are preferably deposited by wash coating; other techniques such as spray coating can also be used.

Figure 7:
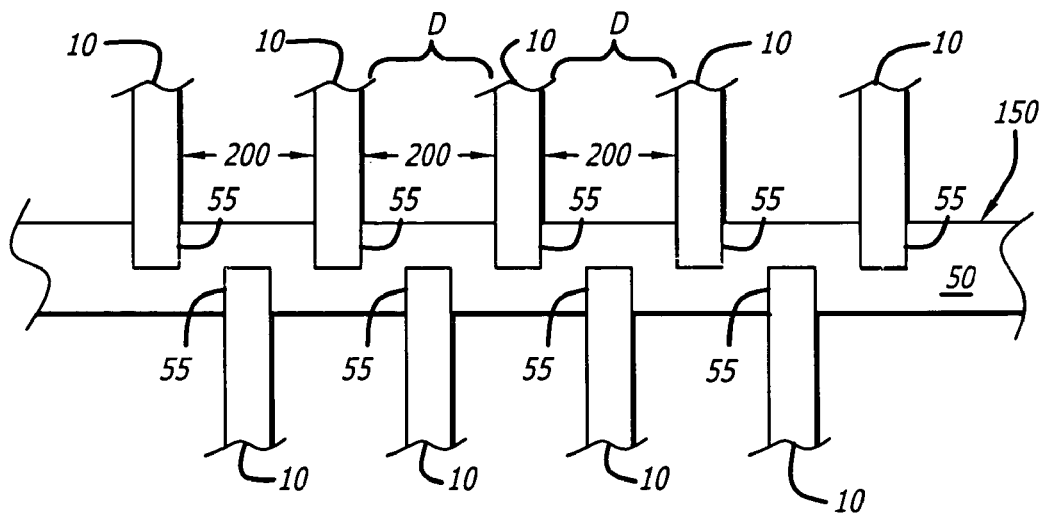
FIG. 7 is a partial cut-away view of a catalysts loaded strips in both a combustion chamber and a reaction chamber.

The embodiment in FIG. 7 shows the reaction chamber 40 and the combustion chamber 45 of a microreactor 100. For compaction, of the microreactor 100, placing the reaction chamber 40 and the combustion chamber 45 in thermal contact 150 (FIG. 7) with each other is an efficient way to transfer the thermal energy from the combustion chamber to the reaction chamber.

Catalysts loaded metal strips 10 (FIG. 7) are mountable and can be placed in one or both of the reaction chamber 40 and the combustion chamber 45 chambers. It is also possible to place the catalysts loaded metal strips 10 in one of the chambers and pack catalyst powders in channels cut, or use catalyst coated foams in another chamber.

One application of one or more microreactors 100 with catalyst 20 loaded metal strips 10 is to facilitate the production of hydrogen for use in fuel cell powered devices. The preferred metal substrate for such strips is stainless steel 316 or Inconel 600 when the reactor operating temperature is between 300 to 650 C and aluminum when the temperature is below 300 C.

Hydrogen supplied to such a fuel cell can be generated by a steam reforming using as feedstock hydrocarbons such as LPG, naphtha, gasoline, kerosene, alcohol, coal or natural gas composed principally of methane or non hydrocarbons such as ammonia or oxygenates such as methanol.

The steam reforming method includes both a reforming reaction and a water gas shift reaction. The reforming reaction results in the production of a substantial amount of carbon monoxide, as well as hydrogen and carbon dioxide. It is known to include a water gas shift reactor which causes the carbon monoxide product to react with water. The carbon monoxide concentration in the shifted gas can be reduced down to several thousands ppm. By proper choice of catalysts and reaction conditions, it is possible to reduce the carbon oxide concentration to below 10%, and more preferably below 5% (on a dry basis).

However, even with this reduction, the residual carbon monoxide concentration is often too great for the hydrogen gas to bee supplied to a PEMFC and the hydrogen gas must be further treated by selective oxidation, or methantion or the like, to remove additional carbon monoxide.

Following are the reaction equations for the steam reforming method, where methane is the feedstock. Equations 1 and 2 (steam reforming) illustrate the reforming reaction, while Equation 3 illustrates the water gas shift reaction.

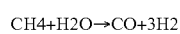
$$CH_4 + H_2O \rightarrow CO + 3H_2 \qquad \text{Equation 1}$$

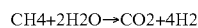
$$CH_4 + 2H_2O \rightarrow CO_2 + 4H_2 \qquad \text{Equation 2}$$

$$CO + H_2O \rightarrow CO_2 + H_2 \quad \text{Equation 3}$$

$$CO + 2H_2 \rightarrow CH_4 \quad \text{Equation 4}$$

These reactions are reversible, exhibit large variations in equilibrium composition depending on temperatures, and require high temperatures to achieve sufficiently high reaction rates.

The reforming reaction is an endothermic reaction, carried out at a temperature of 6000° C. or higher. For heating, it is known to combust part of the feedstock and to utilize the resulting combustion heat. In contrast, the water gas shift reaction (equation 3) is an exothermic reaction, so that lower temperatures are advantageous for reducing the concentration of carbon monoxide.

In both the steam reforming reactor and the water gas shift reactor catalysts can be loaded pursuant to the device via the method described herein. Catalysts for steam reforming of hydrocarbons, such as nickel-or noble metal based catalysts, are readily available from a variety of sources. For example, the catalyst division of Johnson Matthey, in Wayne, Pa., provides suitable catalysts.

Catalysts for the water gas shift are copper-zinc catalysts, other copper-based catalysts, or noble metal compositions that include components such as gold and platinum are available from a variety of sources.

Shown in FIGS. 2 and 3 is a reaction chamber 40 with a thin metal floor 50 into which mounting cavities 50 are formed. Drilling, CNC or EDM are some techniques for forming the cavities 55. Mounting cavities in the thin metal floor 50 are preferred, however it is within the scope of this invention that mounting fixtures may extend from the thin metal floor 50, or be formed in a side wall 42 of a chamber as receiving protrusions, fixture, clasps, cavities, catches, slots, grove, channel, catch or latch (not shown) for mounting arms 32. The strips 10, via the mounting legs 30, can be fitted into the reaction chamber 40. The strips may be catalyst coated before or after mounting, but preferably before mounting.

Figure 6:
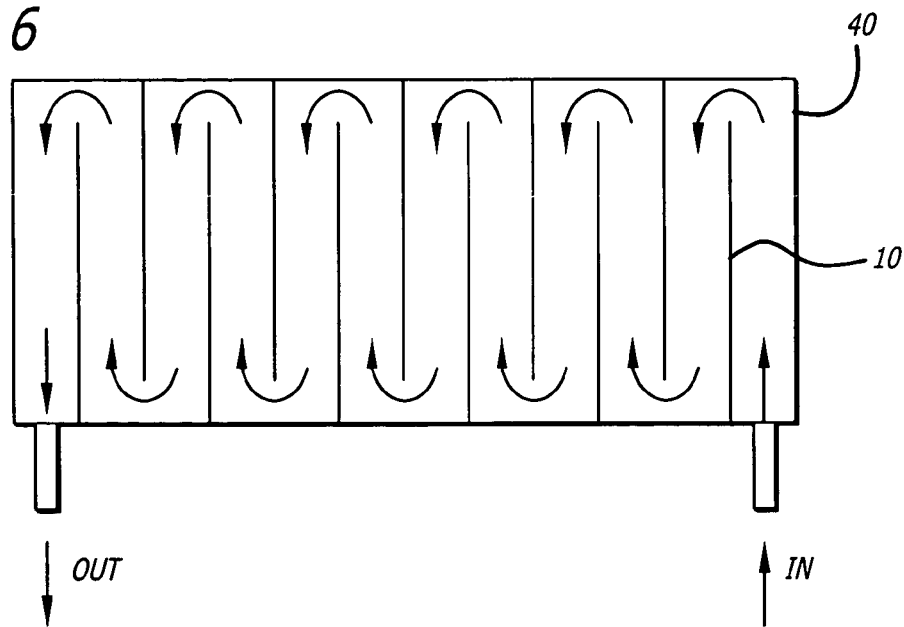
FIG. 6 is another arrangement of the metal strips in a chamber.

One benefit of using the strips 10 is the ability to create substantially parallel channels 200, shown in FIG. 6, separated by a predetermined distance "D" which can be mesoscale spacing. That is, preferably the height and or width of each channel is between 0.01 mm and 10 mm, and is more preferably between 0.5 mm and 5 mm. Mesoscale spacing facilities the flow of a reactant gas through a chamber and over a catalyst 20 without large pressure drops.

The reaction chamber has a reaction chamber inlet 70 (FIG. 2) wherein a fuel to be reformed, natural gas (CH4) for example and steam enters, and an reaction chamber outlet 80 whereby the product, such as hydrogen gas and other by-products of the reformation of the natural gas including carbon monoxide, carbon dioxide can exit. The outlet gas stream can then processed to separate out the hydrogen. As shown in FIGS. 3 and 4 the reaction chamber has a cover 90, which may be affixed via welds 92, or bolts/cap screws 95 and gaskets (gasket not shown). Gasket materials include nickel, copper and grafoil and can be chosen depending upon the reactor operating temperature. Most preferably, the cover 90 is affixed using a braze or a weld.

The microreactor 100 can be fabricated from a variety of nonrefactory metals, such as metal alloys, having good thermal conductivity. Representative metals include titanium and stainless steel. The temperature conditions, in particular, determine the type of materials that can be used in fabricating the reactor (conventional metals, such as heat resistive stainless steel, for temperatures less than 650° C., or refractory metals for higher temperatures). For example, the reforming reaction of natural gas is commonly performed at about 700 to 800° C. By selecting the appropriate catalyst for incorporation in the metal strips a reactor which can reform natural gas at or below 650 C, which therefore allows for construction of less expensive stainless steel may be achieved. Reforming at lower temperatures is advantageous when a hydrogen separation membrane is incorporated into the microreactor 100. The simultaneous separation of hydrogen removes equilibrium limitations and allows for improved hydrogen production rates (via higher conversion of the fuel source) at lower temperatures. In the case of water gas shift reactors in which the operating temperatures may be below 300 C, microreactor 100 can be fabricated from copper or aluminum.

Figure 5A:
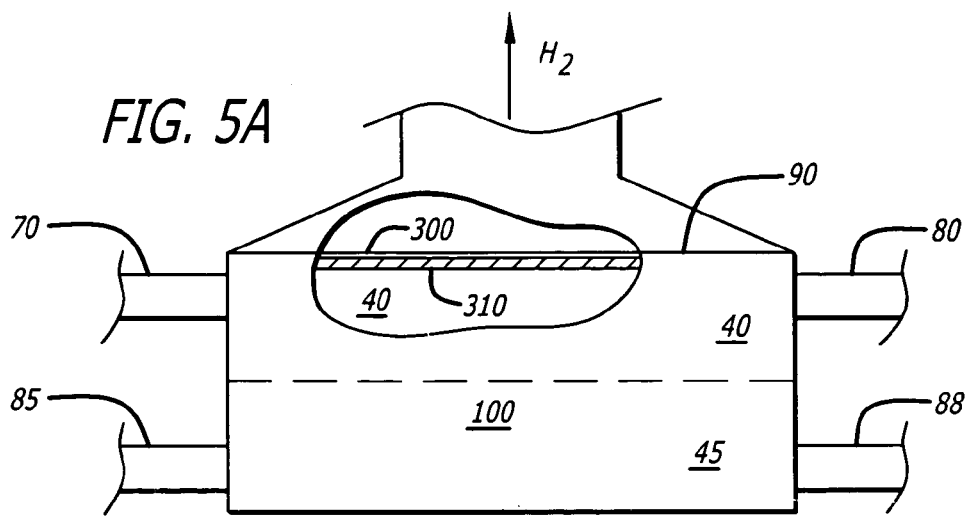
FIG. 5A is a partially cut-away view of another embodiment of a hydrogen generator.
Figure 5B:
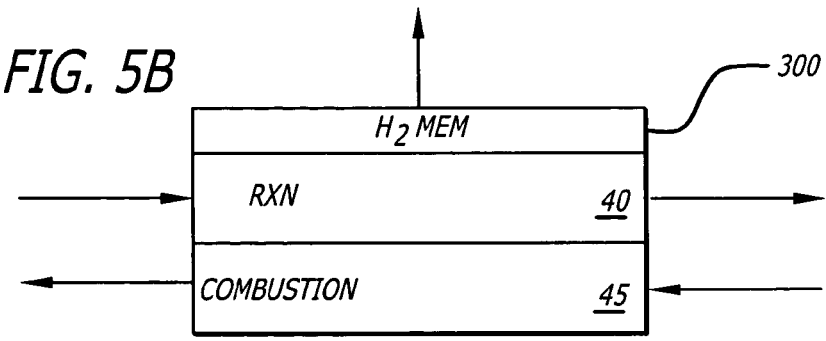
FIG. 5B is a block diagram of the hydrogen generator of FIG. 5A.

FIGS. 5A and 5B show an alternate embodiment of the reaction chamber 40 which incorporates a hydrogen separation membrane 300 onto a porous region 310 of the chamber cover 90. Preferably, the thickness of the porous region 310 is between about 1 and about 5 millimeters. The porous region 310 also comprises a series of pores that form channels through the porous region 310. As defined herein, the pores define openings to the channels. The diameter of the pores may vary. Preferably, the diameter of the pores is between about 1 and 100 microns, and more preferably between about 1 and about 5 microns.

Preferably, the hydrogen separation membrane 300 comprises a material, that can be used to separate hydrogen from a mixed product stream of hydrogen, unreacted hydrocarbons, carbon monoxide, carbon dioxide and other dilutents, such as pure palladium or alloys of palladium. Preferably, the membrane 300 has a thickness of between about 5 to 20 microns, and more preferably between about 5 and about 10 microns.

When the hydrogen separation membrane is a thin foil (for example commercial Pd/Ag alloy foil, which is about 25 microns thick, the foil is affixed to the porus region 310 to form a leak tight assembly using gaskets or by using brazing, or welding techniques that include, but not limited to laser welding.

In another embodiment for the incorporation of catalyst into a chamber, a serpentine flow pattern as indicated by the arrows shown in FIG. 6, can be established by offsetting every other metal strip 10. The serpentine flow pattern can lead to increased heat transfer rates as a result of turbulent flow behavior, which can be beneficial to prevent unwanted temperature gradients for exothermic reactions such as the water gas shift reaction (equation 3). However, the serpentine flow pattern can lead to pressure drops. However, the water gas shift reaction is not strongly effected by pressure because the water gas shift reaction produces the same number of moles products as the number of moles of feed into the reactor chamber.

Compaction of a microreactor 100 can benefit from placing the reaction chamber and combustion chamber adjacent to one another to provide a thermal transfer (FIG. 7). Those skilled in the art will recognize that a lightweight heat exchanger is characterized as having very high heat transfer rates, as well as extremely efficient insulation that minimizes heat loss into the environment. Utilizing the thin metal floor 50 about 1 to about 3 mm in thickness of the reaction chamber as both the reaction chamber 40 floor and the top of the combustion chamber 45 can provide a thermal transfer conduit 150 between chambers.

Shown in FIG. 7 is an embodiment whereby the metal strips are used to load different catalysts into both the reaction chamber 40 and the combustion chamber 45. The thin metal floor 50 has mounting cavities 55 formed on each surface. The metal strips 10, loaded with appropriate catalysts, can then be loaded into each chamber 40 and 45, the thin metal floor facilitating the thermal transfer between chambers.

To generate hydrogen, the microreactor 100 fuel is directed into the combustion chamber and an ignition source is provided to start and/or drive the combustion of the fuel. The heat of combustion is transferred to the reaction chamber 45 via the thin metal floor 50 which acts as a thermal transfer conduit 150. The increased surface area afforded by the metal strips is beneficial to the thermal transfer from the combustion chamber to the reaction chamber as the metal floor 50 with strips mounted on each side behaves as a finned heat exchanger.

The catalyst loading method and device described herein can be applied to a wide variety of reaction chambers and combustion chambers.

For example, in a compact microreactor 100, a catalyst combustion reaction occurring in a combustion chamber 45 can transfer the thermal energy to the reaction chamber 40 (via the thermal transfer conduit 150). The catalysts in the chambers function under different temperature conditions, each catalyst having a characteristic "light-off" temperature (a minimum required temperature below which little or no catalytic activity is observed), as well as a characteristic optimal temperature.) A combustion fuel is added to the combustion chamber 45 thorough a combustion inlet 85 (FIG. 5A), a mixed stream of combusted fuel and unreacted combustion fuel can exit the combustion chamber through a combustion chamber outlet 88. Preferably, the reactor is sized and catalysts are so chosen such that the stream exiting the combustion chamber through outlet 88 is composed of CO2 and water (containing no unreacted hydrocarbons or CO)

Figure 8:
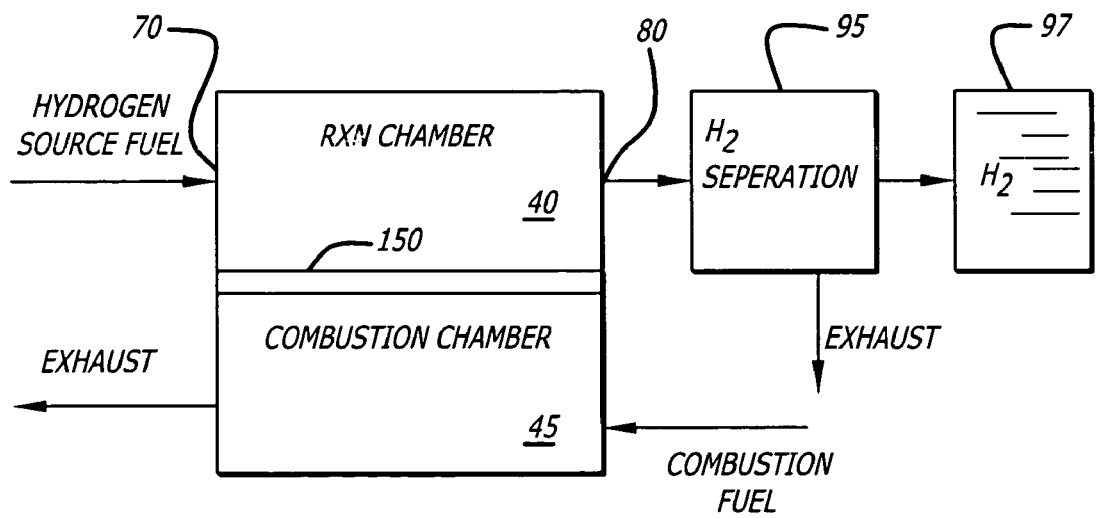
FIG. 8 is a block diagram illustrating the primary components of a hydrogen generator.

When the temperatures in the reaction chamber are suitable for the catalytic reactions to occur, a hydrogen source, which may be a light hydrocarbon for example, and steam is added to the reaction chamber 40 through an inlet 70. In the reaction chamber, a portion of the bound hydrogen is separated from the hydrogen source as hydrogen gas. Accordingly, a hydrogen rich mixed gas stream is produced which may contain by-products such as carbon monoxide, carbon dioxide, dilutents such as excess steam along with the hydrogen gas. The hydrogen rich gas stream either exits the reactor through the outlet 80 and is reed into a hydrogen separation union 95 (FIG. 8) or the hydrogen rich gas stream may exit the reaction chamber through a hydrogen separation membrane 310 as shown in FIGS. 5A & 5B. When a hydrogen separation membrane is employed, the gas stream exiting through exit 80 (FIG. 5A) can be routed into the combustion chamber through inlet 85 to generate heat. The gas stream exiting through exit 80 (membrane reject stream) is composed of hydrogen, CO, CO2, H2O, unreacted hydrocarbon).

Downstream from the hydrogen separation unit, a filter 97 may be placed to further purify the hydrogen gas by remaining non-hydrogen compounds; for example, traces of CO can be removed via the methanation reaction (equation 4) that is conducted below 400 C. The filter is another chamber which may also contain a catalyst to filter out the non-hydrogen compounds. The catalyst for example a methanation may be loaded into the filter 97 in the manner described herein. This method of catalyst coatings is particularly well suited for reactions such as the methanation reaction, whose reaction rate is strongly diffusion-limited.

Although the present invention has been described in connection with the preferred form of practicing it, those of ordinary skill in the art will understand that many modifications can be made thereto without departing from the spirit of the present invention. Accordingly, it is not intended that the scope of the invention in any way be limited by the above description.

The invention claimed is:

1. A method of forming mountable catalyst loaded strip, the method comprising:
    forming a strip, from a base substrate, with a mounting means;
    affixing a catalyst support to both sides of the strip; and,
    coating the catalyst support with a catalyst.

2. The method of claim 1 wherein the mounting means is a catch.

3. The method of claim 2, wherein the mounting catch is at least one extended portion of the strip.

4. The method of claim 2, wherein the mounting catch is at least one edge of the strip.

5. The method of claim 1, wherein the base substrate of the strip is selected from the group consisting of stainless steel, stainless steel 316, nickel, FeCrAlY and Inconel 600, copper, aluminum, ceramic, and alumina.

6. The method of claim 1 wherein the catalyst support contains at least one of alumina, silica, zirconia and ceria.

7. The method of claim 1, wherein the catalyst is selected from the group consisting of nickel, iron, molybdenum carbide, copper, copper-zinc catalysts, and noble metals including platinum, rhodium, palladium, and gold.

8. A catalyst loaded strip comprising;
    a substantially planar-strip of a base substrate with a mounting means;
    a catalyst support affixed to the base substrate on both sides of the strip; and
    a catalyst coated onto the catalyst support.

9. The catalyst loaded strip of claim 8 wherein the catalyst support is selected from the group consisting of alumina, silica, zirconia and ceria.

10. The catalyst loaded strip of claim 8 wherein the mounting means is at least one extended catch.

11. The catalyst loaded strip of claim 8, wherein the base substrate of the strip is selected from the group consisting of stainless steel, stainless steel 316, nickel, FeCrAlY, Inconel 600, copper, aluminum, ceramic and alumina.

12. The catalyst loaded strip of claim 8, wherein the catalyst is selected from the group consisting of nickel, iron, molybdenum carbide, copper, copper-zinc catalysts, and noble metals including platinum, rhodium, palladium, and gold.

13. The catalyst loaded strip of claim 8, wherein the mounting means is at least one edge of the strip.

* * * * *